United States Patent [19]

Janssens et al.

[11] 4,270,688

[45] Jun. 2, 1981

[54] APPARATUS FOR MANUFACTURING GLAZING PANELS

[75] Inventors: Theo Janssens, Mol; Victor Willems, Retie, both of Belgium

[73] Assignee: B. F. G. Glassgroup, Paris, France

[21] Appl. No.: 43,029

[22] Filed: May 29, 1979

[30] Foreign Application Priority Data

Jun. 14, 1978 [GB] United Kingdom ............... 26975/78

[51] Int. Cl.$^3$ ............................................. C03C 27/08

[52] U.S. Cl. ....................................... 228/5.1; 72/319; 72/388; 113/116 HA; 156/109

[58] Field of Search ........................ 228/5.1, 6 R, 15.1, 228/17, 18; 113/116 HA; 72/319, 320, 388, 177; 29/429, 782, 788; 156/109

[56] References Cited

U.S. PATENT DOCUMENTS

| | | | |
|---|---|---|---|
| 2,193,393 | 3/1940 | Danner | 428/34 |
| 2,625,717 | 1/1953 | Wampler et al. | 428/34 |
| 3,744,697 | 7/1973 | Jacquot et al. | 228/5.1 |
| 3,876,489 | 4/1975 | Chenel | 156/109 X |
| 3,901,064 | 8/1975 | Jacobson | 72/319 X |

FOREIGN PATENT DOCUMENTS

| | | | |
|---|---|---|---|
| 2352835 | 5/1975 | Fed. Rep. of Germany | 156/109 |

*Primary Examiner*—Gil Weidenfeld
*Assistant Examiner*—Kenneth J. Ramsey
*Attorney, Agent, or Firm*—Spencer & Kaye

[57] ABSTRACT

An apparatus for manufacturing a glazing panel which includes a pair of glazing sheets separated by an intervening marginal spacer frame formed to a required size and shape from strip material and marginally secured between the pair of sheets. The apparatus comprises a frame forming mechanism which includes guides defining at least two paths for feeding required lengths of the strip material, stops defining a position for the leading ends of the strip material as it is fed, a plurality of bending stations arranged to bend the strip material on at least one of the paths to form frame corner angles at required distances from the stops, and apparatus for joining the ends of spacer strip material which has been fed along the paths and bent, thereby to form the frame.

25 Claims, 8 Drawing Figures

APPARATUS FOR MANUFACTURING GLAZING PANELS

BACKGROUND OF THE INVENTION

This invention relates to a method of manufacturing a glazing panel comprising a pair of glazing sheets separated by an intervening marginal spacer frame in which the spacer frame is formed of strip material and is marginally secured between the pair of sheets. The invention extends to an apparatus for performing the method and to hollow panels manufactured using the method.

In the manufacture of glazing panels, it has hitherto been the usual practice to form a spacer frame in situ on a first sheet and then to apply a second sheet thereto to form a double panel unit. A further spacer frame may be formed on, and a third sheet may be similarly applied to, the second sheet if it is desired to form e.g. a triple panel unit. This procedure usually requires the use of highly skilled labour.

SUMMARY OF THE INVENTION

The present invention may be considered as having two aspects. The first aspect of the invention relates particularly to the formation of the spacer frame, and the second aspect to the positioning of a spacer frame on a glazing sheet.

The present invention in its first aspect provides, as broadly defined, a method of manufacturing a glazing panel comprising a pair of glazing sheets separated by an intervening marginal spacer frame in which a the spacer frame is formed of strip material and is marginally secured between the pair of sheets. This spacer frame is formed by supplying the strip material in two or more separate lengths, bending at least one such length to form angles of such sizes and at such positions that a frame of the required shape and size can be formed by joining together the end portions of such lengths, and joining such end portions to form the frame.

The present invention accordingly provides a method of mechanically forming a spacer frame for incorporation into a hollow panel unit which thus reduces the requirement for highly skilled labour and has other attendant advantages which are particularly apparent in series production.

In preferred embodiments of the invention, the end portions are joined together in overlapping relationship. This simplifies sealing of the panel at the regions of the ends of the strip material.

Preferably, the lengths of spacer strip material are brought together so that their ends overlap by the bending operation. This greatly facilitates the frame assembly operation.

Advantageously, the overlapping end portions of spacer strip material are crimped together. This provides a temporary joint of sufficient strength to hold the frame together during its subsequent transfer and assembly between a pair of sheets.

In preferred embodiments of the invention, the frame is formed from spacer strip material which has been folded along its length to provide a web portion for determining the inter-sheet spacing of the glazing panel into which it is to be incorporated, and at least one flange portion for attachment in face-to-face relation to a sheet of the panel. This feature has a beneficial effect on the structural rigidity of the frame prior to assembly between the sheets of the panel, and confers the further advantage of allowing an improved form of spacer-to-sheet joint to be formed. Optimally, said spacer strip material is of or is folded into channel form, having a flange for attachment to each sheet of the pair.

In embodiments of the invention in which channel form strip material is used, it is especially preferred that the side walls only of the channels are crimped together at each zone of overlap.

Where such flanged spacer strip material is used, it is preferred that, of each pair of overlapping end portions, the flange or each flange of one end portion is kinked to narrow the web of that end portion so that that end portion nests inside the other end portion of the pair when they are joined together. The adoption of this feature provides a more uniform surface for attachment to a sheet of the panel.

Preferably, the strip material is bent by rolling it around a backing support while supporting the flange or each flange. This enables the flange or each flange to be maintained in planar form for attachment to a the sheet. It is especially suitable if the strip material is bent so that the flange(s) is stretched during the bending operation, since such support is thereby made easier.

Advantageously, the web portion of the spacer strip material is deformed across its width at each bend, and preferably such deformation is effected progressively during the bending operation. This enables stresses which appear in the flange(s) as a result of the bending operation to be supported in a more predictable manner, so that a stable form of spacer frame can consistently be formed, and this is especially important in series production of hollow panels.

The invention can be used in the manufacture of spacer frames of various shapes, for example, triangular or hexagonal frames for incorporation into correspondingly shaped panels, but the invention is particularly applicable to the manufacture of quadrilateral spacer frames, and especially to the manufacture of rectangular spacer frames.

In the manufacture of a quadrilateral spacer frame, it is preferred that two lengths of spacer strip material are used to form the frame.

In some embodiments of the invention, one such length of spacer strip material is bent four times to form quadrilateral frame corners while the other such strip remains straight, and in some other embodiments, there is one strip length which is bent once while the other is bent in three places. In the most preferred embodiments of the invention however, each length of strip material is bent in two places, because this simplifies the design of the bending apparatus.

Advantageously, one length of spacer strip material is bent at two positions such that a short retaining limb of strip material leads from each such bend to each end of that length of material. A limb may for example be 2 to 15 cm long measured from the apex of such bend to the end of the length of spacer strip material. This enables the ends of the strips to be more easily held in a stable manner so that when they are brought together it is easier to join them in the desired manner.

In general, for the size of hollow panel unit with which this invention is primarily concerned, that is, hollow panels whose shortest side is at least 20 cm long, the adoption of this feature enables that length of spacer strip material to be bent at positions which depend on one desired side length only of the panel, while the other strip is cut to length and bent at positions which depend on the desired lengths of the other three sides of the panel. This simplifies the apparatus required for the performance of the invention. One length of spacer can always be bent at positions located at predetermined distances from its ends, and these distances need not be changed no matter what size of panel is being manufactured, so that the apparatus for joining together the ends of the spacer strips can be in fixed location with respect to each of a pair of bending stations where such retaining limbs are bent.

Advantageously, overlapping end portions of the flanged spacer strip material are brought together so that at each zone of overlap, a short retaining limb nests within the end of the other length of spacer strip material.

The length of spacer strip material may be pre-cut to the desired size or sizes and fed, e.g. in pairs, to a frame forming mechanism, but it is preferred that lengths of spacer strip material each be fed from a continuous stock and cut to length prior to bending.

Preferably, the spacer strip material is fed between rollers arranged to profile the strip lengths to define a web and at least one flange portion.

In the most preferred embodiments of the invention, there are two lengths of spacer strip material and these are supplied in parallel, are cut to length, and are bent and joined to form a rectangular spacer frame.

The present invention extends to a glazing panel, for example a hollow glazing panel, which has been manufactured by a method as defined above.

After completion of the frame, it may be removed for storage and subsequent incorporation into a panel, but it is preferably transferred directly to one sheet of the panel preparatory to positioning of the other sheet of the pair in contact with the frame.

This feature of the first aspect of the invention is considered to be of particular importance because of the way in which it simplifies the transfer of a preformed spacer frame to a sheet for incorporation into a hollow panel.

Indeed, this feature of the first aspect of the invention is not limited to any particular method of preforming such a spacer frame, and accordingly, in its second aspect, as broadly defined, the present invention provides a method of manufacturing a glazing panel comprising a pair of glazing sheets separated by an intervening marginal spacer frame in which a frame is formed of strip material and is marginally secured between the pair of sheets. The frame is formed from the strip material by bending it and joining its ends together and the thus formed frame is transferred directly to one of the sheets preparatory to positioning of the other sheet of the pair in contact with the frame.

Preferably the frame is transferred by vertical movement to a sheet located beneath a station in which the frame is formed and advantageously opposed end portions of the strip material are bent relative to an intervening portion which will constitute one side of the frame and which is moved parallel with itself during the transfer.

In the most preferred embodiments of the second aspect of the invention, the frame is formed by a method according to the first aspect of the invention.

The present inventionn is primarily concerned with the manufacture of glazing panels comprising a pair of vitreous sheets separated by an intervening marginal spacer frame formed of a metallic strip material, and in such cases it is preferred that the panel should be bonded together by soldering the spacer frame to metallised margins of the sheets.

The invention includes apparatus for performing the method according to the first aspect of the invention, and accordingly provides apparatus for use in manufacturing a glazing panel comprising a pair of glazing sheets separated by an intervening marginal spacer frame formed to a required size and shape from strip material and marginally secured between the pair of sheets. The apparatus comprises a frame forming mechanism which includes guide means defining at least two paths for feeding required lengths of the strip material, stop means defining a position for the leading ends of such strip material as it is fed, a plurality of bending stations arranged to bend such strip material on at least one path to form frame corner angles at required distances from the stop means, and means for joining the ends of spacer strip material which has been fed along said paths and bent, thereby to form the frame.

The invention provides apparatus for mechanically forming a spacer frame for incorporation into a hollow panel and thus reduces the requirement for highly skilled labour while at the same time permitting the uniform production of such frames.

Preferably, at least one bending station comprises a backing support abutment and a strip bending member mounted for movement relative to said abutment for progressively wiping or rolling the strip about the abutment.

Advantageously, the abutment and bending member at each such bending station are relatively retractable, so that spacer strip material of channel form can easily be released from such station after bending.

Preferably, the abutment and bending member are shaped to support the flange(s) of flanged spacer strip material at the bending zone during bending. This can readily be arranged by using an abutment which defines a channel portion for receiving the flanged spacer strip material and mounting the bending member so that it can enter such channel to support the flange(s) of spacer strip material located therein, as is preferred.

Advantageously, the abutment and bending member are shaped and arranged to deform the web of flanged spacer strip material at the bending zone to relieve bending stresses in the flange(s).

Preferably, the abutment and bending member have complementary cross-sections.

The bending station, stop means and paths may be relatively spaced so that the ends of strip material fed along the paths can be brought together in overlapping relationship by the bending operation alone. For the production of a series of frames of the same dimensions, such bending stations, stop means and paths may be at fixed locations.

In order to facilitate the production of spacer frames of different dimensions on a single apparatus, it is preferred that means be provided for relatively displacing at least one bending station and/or stop means and/or path so that the ends of strip material fed along said paths can be brought together in overlapping relationship by the bending operation.

Advantageously, the joining means comprises at least one crimping mechanism for joining overlapping ends of the spacer strip material.

Preferably, a channel support member is provided for supporting each pair of overlapping ends of the spacer strip material, and the crimping mechanism comprises a pair of crimping jaws shaped to enter the channel of such support member and engage the side walls of such channel so that on such entry they are progressively closed by cam action.

Advantageously, the apparatus has two parallel feed paths for the spacer strip material, and preferably there are two bending stations located on each such path.

Preferably, means are provided for feeding said spacer strip material along each path from a continuous stock, and stop means and spacer strip cutting means are located on each path.

Advantageously, upstream of such cutting means there is provided, on each path, profiling means (e.g. rollers) for folding flat strip material into channel form as it feeds from its stock along its path.

Advantageously, cutting means on one path are associated with a mechanism for narrowing the web of the trailing end of the cut length of spacer strip material and the web of the leading end of the continuous stock.

In preferred embodiments of the invention, on one path, the stop means are located a fixed distance downstream (in relation to the direction of a strip feed) of the downstream bending station and the cutting means are located a fixed distance upstream of the upstream bending station, and preferably in each case the distance is such that strip material fed along the path to the stop means and cut to length and bent will have end limb portions between 2 and 15 cm long measured from each end to the apex of the closer bend.

Preferably, there is one fixed and one movable bending station on each path. This allows the manufacture of frames of different lengths.

Advantageously, the guide means are movable to cause relative approach or separation of the paths, and the stop means and cutting means are movable along one of the paths. This allows the manufacture of frames of different widths.

The invention includes a plant for the manufacture of glazing panels comprising a pair of glazing sheets separated by an intervening marginal spacer frame formed to a required size and shape from strip material and marginally secured between the pair of sheets. This plant includes a conveyor for conveying glazing sheets, a mechanism for forming a frame above the conveyor and means for effecting release of the frame onto an underlying glazing sheet on the conveyor.

Preferably, the plant includes a second conveyor for conveying sheets and means for transferring sheets from the second conveyor onto a spacer frame on a sheet carried by the first conveyor.

DESCRIPTION OF THE PREFERRED EMBODIMENTS

Figure 1:
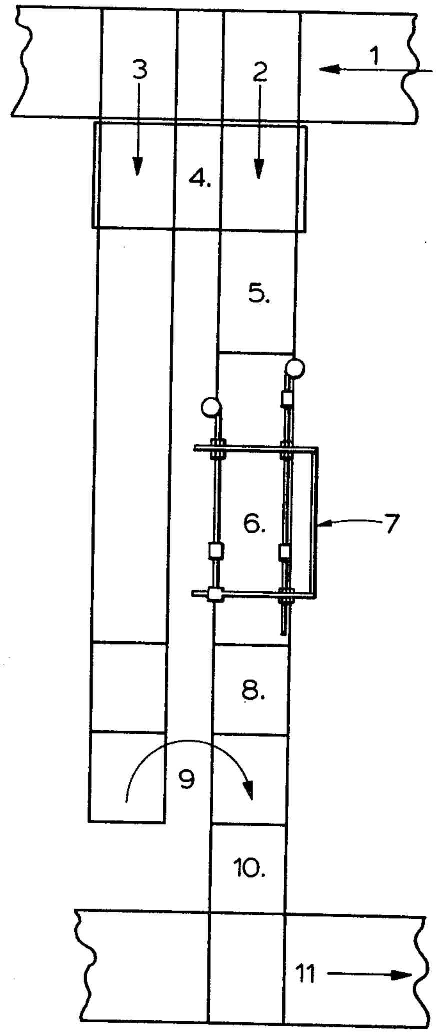
FIG. 1 illustrates a plant for the manufacture of hollow panels in accordance with the invention.

In FIG. 1 sheets, e.g. of glass (not shown) are brought along a feed conveyor 1 whence they are transferred to two parallel conveyors 2, 3 of a panel assembly line. A stockpile 4 may be built up at the start of these parallel conveyors 2, 3. These conveyors are indicated as being divided into various zones where different operations may be performed. On the conveyor line 2, sheets pass through a first zone 5 where their position and size can be checked. They are then fed to a zone 6 located beneath a frame forming apparatus 7 constructed in accordance with the invention. After a spacer frame has been formed there and deposited on an underlying sheet, the sheet and frame pass to a zone 8 where the positioning of the frame can be adjusted. A second sheet meanwhile has been conveyed along the second of the parallel conveyors 3.

When these two sheets reach a zone 9, the second sheet is transferred onto the frame lying on the first sheet, and the assembly continues along the conveyor line 2 to a bonding zone 10 and from there to an exit conveyor 11.

Figure 2:
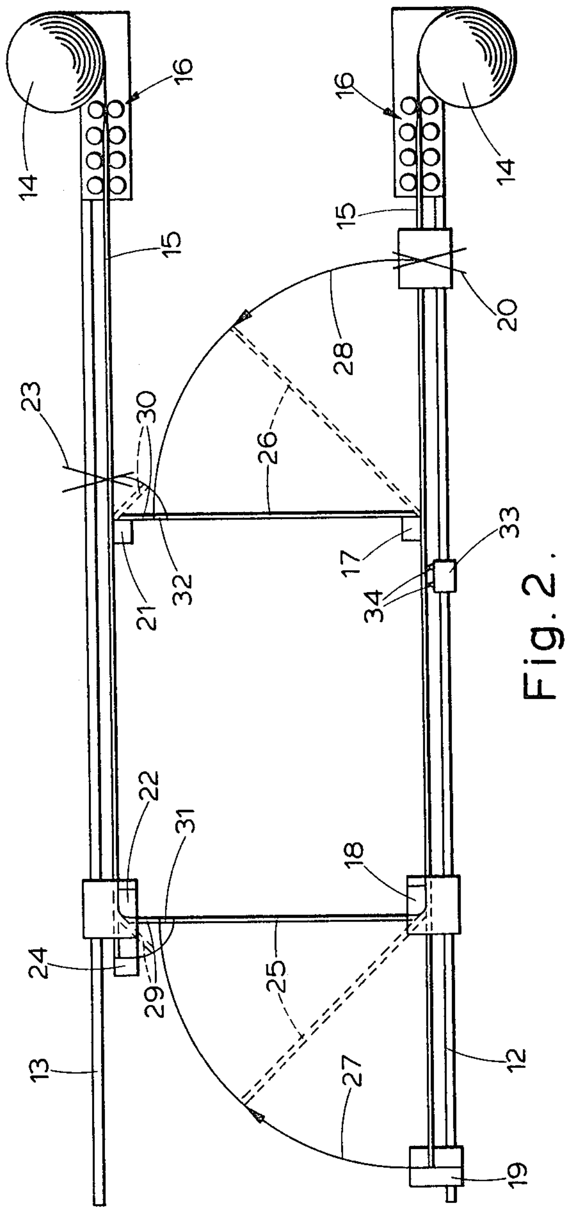
FIG. 2 illustrates an embodiment of frame forming apparatus in accordance with the invention.

FIG. 2 shows the frame forming apparatus 7 in greater detail.

The mechanism comprises a pair of parallel guide rails 12, 13 of which one 12 is fixed while the other 13 is movable parallel with itself towards or away from the first. Each guide rail 12, 13 carries a reel 14 of flat spacer strip material, e.g. of copper coated with tin and/or solder alloy from which the spacer strip material 15 is delivered to a series of profiling rollers 16 arranged to fold the spacer strip material 15 into channel form.

The fixed rail 12 carries a first bending station 17 at a fixed position along its length. Downstream of the first bending station 17, there is located a second bending station 18 which is adjustable in position along the rail 12, and downstream of that is located an end stop 19 adjustable in position along the rail 12 with respect to each of the bending stations 17, 18. A cutter 20, also adjustable along the rail 12 is located upstream of the first bending station 17 for cutting the spacer strip material 15 to length.

The movable guide rail 13 carries a fixed bending station 21 located opposite the fixed bending station 17 on the fixed rail 12, and a movable downstream bending station 22. A cutter 23 is located a short fixed distance upstream of the fixed bending station 21, and an end stop 24 is ganged for movement with the movable bending station 22.

After the size of the sheet for which a frame is required has been checked, the movable bending stations 18, 22 are positioned as necessary with respect to the fixed bending stations 17, 21 to ensure that the frame will be of the correct length; the guide rail 13 is moved as necessary relative to the fixed guide rail 12 to ensure that the frame will be of the correct width, and the cutter 20 and end stop 19 are positioned along the fixed guide rail 12 to ensure that the correct length of spacer strip 15 is drawn off.

When the spacer strip material 15 has been fed to the end stop 19 and cut to length, its free ends 25, 26 are bent following arcs 27, 28 to their positions shown in full lines. After this, the free ends 29, 30 of the spacer strip material fed along the movable rail 13 to the end stop 24 and cut to length are also bent around as shown so that they overlap and nest within the free ends 25, 26 of the other length of strip material 15 at overlap zones 31, 32.

It will be noted that because the end stop 24 is ganged to the movable bending station 22 and because the cutter 23 is a fixed distance upstream of the fixed upstream bending station 21, the free ends 29, 30 of the spacer strip material fed along the movable guide rail 13 will when bent always lie in zones 31, 32 (the overlap zones) which are fixed in relation to their associated bending station 22, 21 respectively. Crimping means (not shown) are provided at each overlap zone.

Also shown in FIG. 2 is an optional device 33 having a pair of points 34 for puncturing the spacer strip material. The punctures (not shown) permit pressure equalisation between the interior and exterior of the glazing panel to be manufactured, and also permit the interior of the panel to be flushed with dry air or some other gas mixture. The punctures also provide paths through which the panel interior may be evacuated. After conditioning of the interior atmosphere of the panel, the punctures may be sealed, e.g. with solder.

Figure 3:
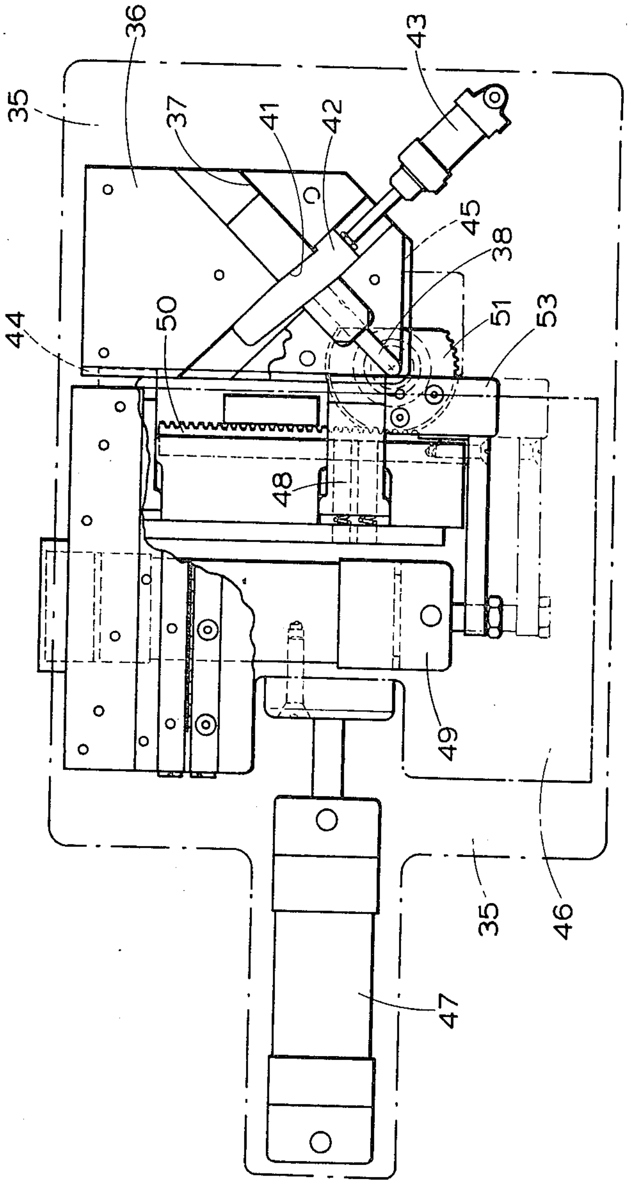
FIGS. 3 and 4 are respectively plan and side views partly in cross section of a frame bending station.
Figure 4:
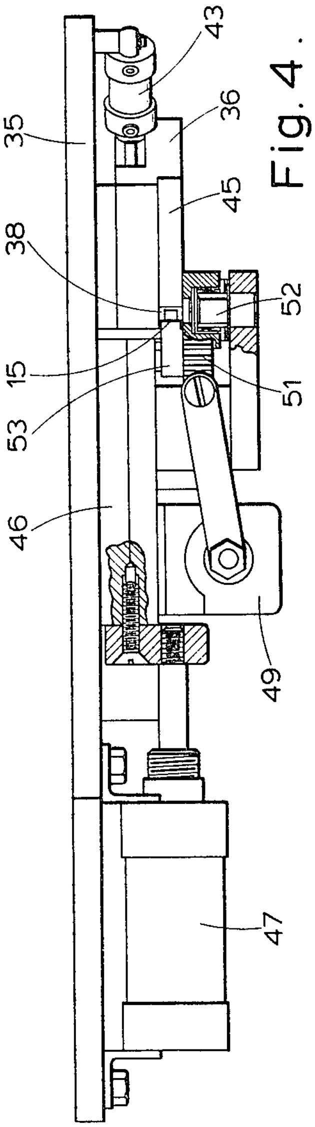
Figure 5:
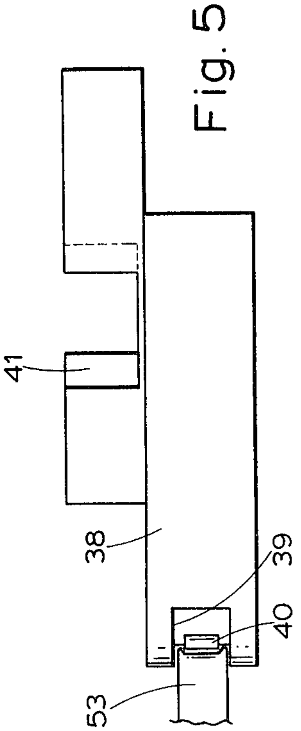
FIG. 5 is a detailed view of a backing support tool of a bending station.

FIGS. 3 and 4 are respectively plan and sectional views of bending stations such as 17 and 22. The bending stations 18 and 21 would be constructed as mirror images of these bending stations. The bending station shown comprises a support plate 35 to which is fixed a block 36 defining a track 37 for a backing support tool 38 shown in greater detail in FIG. 5. As shown in FIG. 5, the head of the backing support tool 38 is in the form of a channel 39 which has a protuberance 40 in its base for deforming the web of a length of spacer strip at the apex of the bend during the bending process. To assist in this, the tool 38 is provided with an oblique channel 41 in which runs a wedging member 42 (FIG. 3) operable by a ram 43 to thrust the backing support tool 38 into the apex of the bend. The side walls of the channel 39 serve to support the flanges if any of a length of spacer strip material against splaying during bending.

The block 36 has along the lower edge of one side thereof an L-shaped recess 44 into which a length of spacer strip material can be fed prior to bending, and on an adjacent side, a similar L-shaped recess 45 into which the free end of the strip material can be bent. The block 36 and backing support tool 38 thus together act as a former around which the spacer can be bent.

The support plate 35 also carries a slide 46 operable by a ram 47 to clamp a length of spacer strip material in the recess 44 of the backing block 36. In particular, the slide carries a spring loaded clamping member 48 shaped to enter a channel form spacer strip 15 and clamp it in the recess 44 close to the apex of the bend to be formed.

The slide 46 carries a bending ram 49 attached to a rack 50 which engages a pinion 51 mounted for rotation on an axle 52 concentric with the centre of curvature of the bend to be imparted to the spacer material.

The pinion 51 has fixed thereto a bending tool 53 shaped to nest inside a channel form spacer member so as to support its flanges against inward folding, and having an edge face complementary in shape to the head of the backing support tool 38 (see also FIG. 5).

As the bending ram 49 draws out the rack 50, the pinion 51 is rotated so that the bending tool 53 rolls the spacer strip material 15 around the backing support constituted by the recesses 44, 45 of the block 36 and by the tool 38. If desired the recesses 44, 45 may be so aligned that the spacer strip is bent through slightly more than the required angle, say 1° to 2° more, to allow for elastic recovery.

After bending, the overlapping ends of the spacer strip in the overlap zones 31, 32 (FIG. 2) are crimped together by an apparatus such as will be described with reference to FIG. 6, and when the ends have been crimped together, the clamping ram 47 is operated to withdraw the slide 46 and the members 48 to 53 carried thereby and the support tool 38 is also withdrawn so that the thus formed spacer frame can drop onto an underlying glazing sheet.

Figure 6:
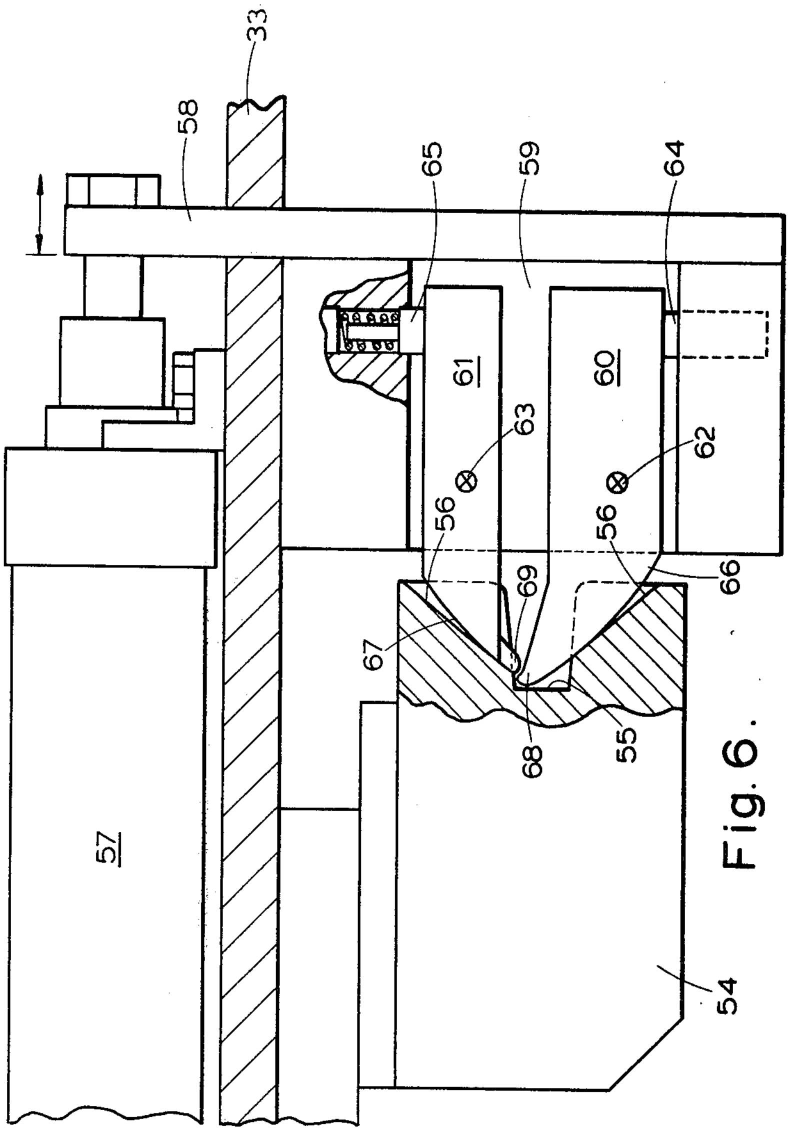
FIG. 6 is a side view of spacer flange crimping means.

The crimping apparatus shown in FIG. 6 comprises a spacer guide block 54 mounted to the support plate 35 of a bending station 21 or 22 on the movable guide rail 13 in the overlap zone 32 or 31 respectively. The guide block 54 comprises a channel 55 for receiving overlapping ends of the spacer strip material which is partially cut away in the plane of the figure to provide camming surfaces 56. Also mounted on the support plate 35 is a crimping ram 57 whose piston rod is attached to an arm 58 carrying a slide 59 movable with respect to the support plate 35 and carrying crimping levers 60, 61 pivotally mounted to the slide at 62, 63. The crimping levers 60, 61 are biassed towards their open positions by spring plungers 64, 65. The front ends of the crimping levers are provided with camming surfaces 66, 67 so that as the crimping ram is operated to cause approach of the crimping levers 60, 61 to the spacer guide block 54, these camming surfaces 66, 67 engage the camming surfaces 56 of the guide block to cause the levers to close and thus crimp together the flanges of overlapping ends of channel form spacer strip material caught between the crimping heads 68, 69 provided on the levers. As an alternative, or in addition to the slide 59 being movable, the guide block 54 itself may be movable.

Figure 7:
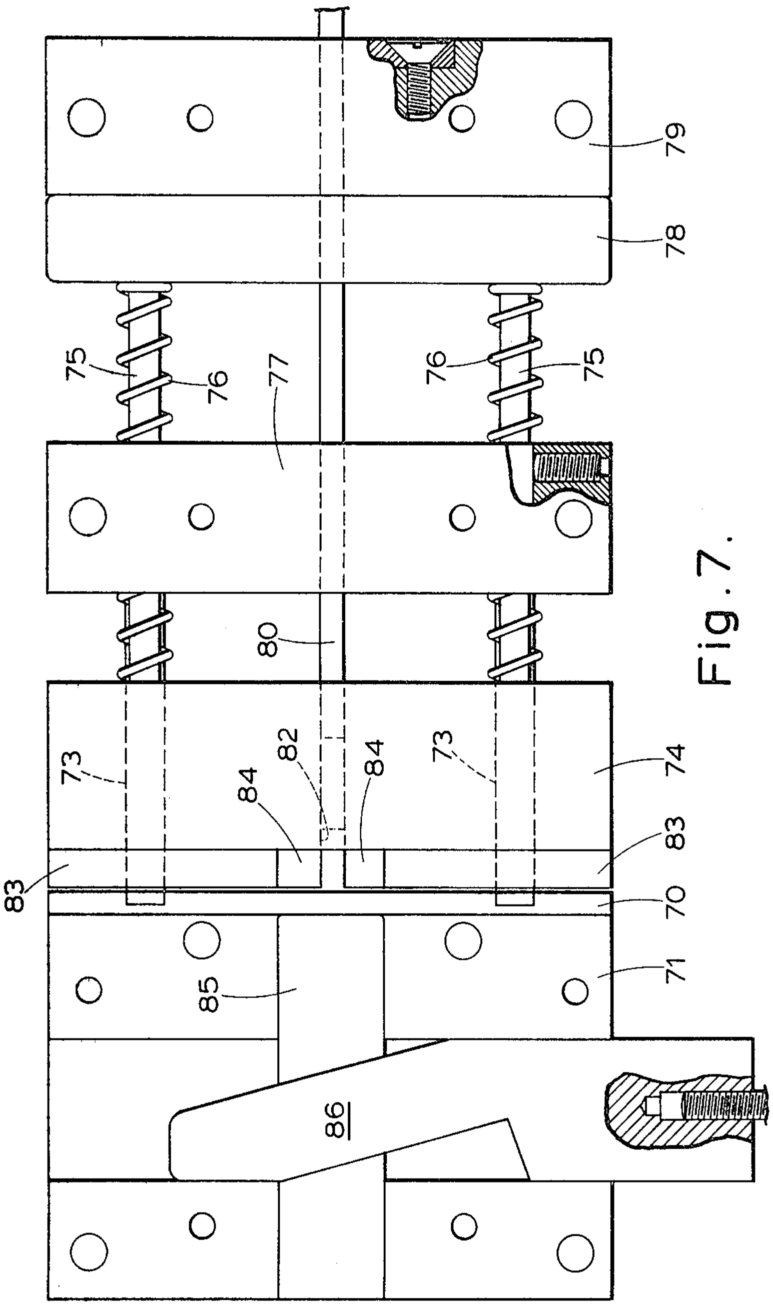
FIGS. 7 and 8 are respectively plan and side views of an embodiment of a spacer strip cutter.
Figure 8:
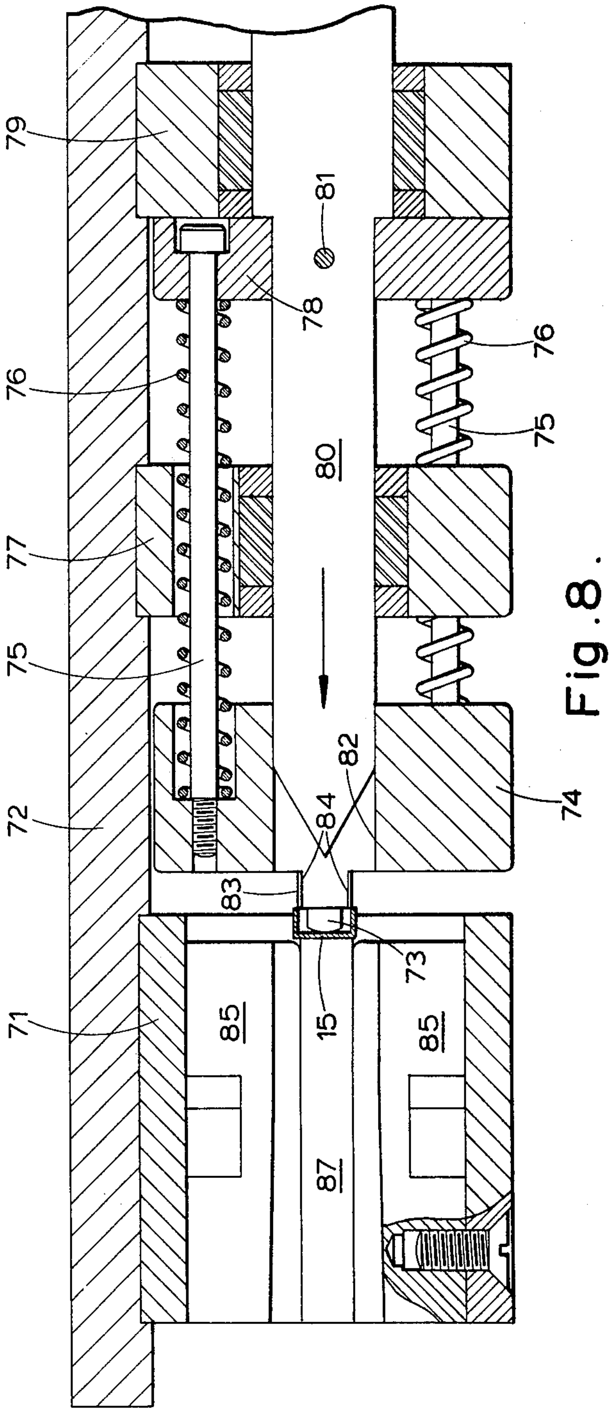

FIGS. 7 and 8 show an apparatus for cutting channel form spacer material to length while at the same time narrowing the channel at the cut ends so that such ends can nest inside overlapping non-narrowed channel ends.

Channel form spacer strip material 15 is fed along a channel 70 in a block 71 fixed to a supporting frame 72. The strip 15 is held in place by guides 73. A movable support 74 is attached to four guide bolts 75, each surrounded by a spring 76, and the bolts and springs lead through holes in a block 77 fixed to the frame 72. The guides 73 are fixed in the block 77 and the movable support 74 is slidable along them. A slide 78 is carried by the bolts 75 and is thrust against the bolt heads by the springs 76. A stop block 79 limits rearward travel of the slide 78. A shearing punch 80 leads through passages in the movable support 74, block 77, slide 78 and stop block 79, and is fixed with respect to the slide 78 by a pin 81. The passage through the movable support 74 is indicated at 82. To either side of this passage 82 there is a rectangular projection 83 on the movable support 74 which is of a size to fill the channel form strip 15 and clamp it in the channel 70 of the block 71. For a short distance immediately to either side of the passage 82, this projection is of reduced dimensions as shown at 84.

Carried by the fixed block 71, in register with the reduced portion 84 of the projection 83 is a swaging die 85 which is slidable under the control of a ram operable wedge member 86. The die 85 has a through passage 87 to allow sheared portions of spacer strip material to be thrust therethrough when the device is operated.

In operation, when the desired cutting point on the spacer strip material 15 is opposite the shearing punch, this is thrust forward by a ram (not shown). The punch 80 carries with it the slide 78, and this in turn via the springs 76 pushes forward the movable support 74 until the strip material 15 is clamped firmly in the channel 70 by the projections 83. Further movement of the shearing punch 80 compresses the springs 76 and the punch then slides in the passage 82, until it punches out a portion of the strip material 15 and pushes it into the swaging die passage 87. The swaging die 85 then advances on the spacer strip from the opposite direction and swages its flanges down on the reduced portions 84 of the rectangular projection 83, on both sides of the cut, so that the web of the end portions of the strip material are narrowed and the end portions can nest inside an overlapping end of another length of channel spacer strip material on formation of the frame.

The cutting device illustrated in FIGS. 7 and 8 is designed to constitute the cutter 23 (FIG. 2) on the movable guide rail 13.

The other cutter, shown at 20 in FIG. 2, may be made in substantially similar manner except that there is no requirement for a swaging die such as 85 nor is there any requirement for the clamping projections 83 to have portions such as 84 of reduced height.

We claim:

1. Apparatus for use in manufacturing a glazing panel including a pair of glazing sheets separated by an intervening marginal spacer frame formed to a required size and shape from strip material and marginally secured between the pair of sheets, comprising a frame forming mechanism which includes guide means defining at least two paths for feeding required lengths of such strip material, stop means defining a position for the leading ends of such strip material as it is fed, a plurality of bending stations arranged to bend such strip material on at least one said path to form frame corner angles at required distances from said stop means, and means for joining the ends of spacer strip material which has been fed along said paths and bent, thereby to form the frame.

2. Apparatus according to claim 1, wherein at least one said bending station comprises a backing support abutment and a strip bending member mounted for movement relative to said abutment for progressively wiping or rolling the strip about the abutment.

3. Apparatus according to claim 2, wherein the abutment and bending member at each bending station are relatively retractable.

4. Apparatus according to claim 2 or 3, wherein the strip material is flanged and said abutment and bending member are shaped to support a flange of the flanged spacer strip material at said at least one bending station during bending.

5. Apparatus according to claim 4, wherein said abutment defines a channel portion for receiving the flanged spacer strip material and said bending member is mounted so that it can enter said channel portion to support a flange of spacer strip material located therein.

6. Apparatus according to claim 4, wherein said abutment and bending member are shaped and arranged to deform the web of flanged spacer strip material at said at least one bending station.

7. Apparatus according to claim 2 or 3, wherein said abutment and bending member have complementary cross-sections.

8. Apparatus according to claim 1, 2 or 3, further comprising means for relatively displacing at least one of said bending stations, said stop means and guide means defining one said path so that the ends of strip material fed along said guide means can be brought together in overlapping relationship by the bending operation.

9. Apparatus according to claim 8, wherein said joining means comprises at least one crimping mechanism for joining overlapping ends of the spacer strip material.

10. Apparatus according to claim 9, further comprising a channel support member presenting a channel, which support member is provided for supporting each pair of overlapping ends of the spacer strip material, wherein said crimping mechanism comprises a pair of crimping jaws shaped to enter the channel of said support member and engage the side walls of said channel so that on such entry they are progressively closed by cam action.

11. Apparatus according to claim 1, 2 or 3, further comprising means defining two parallel feed paths for the spacer material.

12. Apparatus according to claim 11, wherein there are two bending stations located on each path.

13. Apparatus according to claim 11 further comprising means for feeding said spacer strip material along said means defining each feed path from a continuous stock, wherein stop means and spacer strip cutting means are located along said means defining each feed path.

14. Apparatus according to claim 13, further comprising, upstream of said cutting means, on each path, profiling means for folding flat strip material into channel form as it feeds its said stock along its path.

15. Apparatus according to claim 14, wherein said profiling means comprise rollers.

16. Apparatus according to claim 13 wherein said cutting means on one said path includes a mechanism for narrowing the web of the trailing end of the cut length of spacer strip material and the web of the leading end of the continous stock.

17. Apparatus according to claim 13, wherein along the means defining one said feed path stop means is located a fixed distance downstream, in relation to the direction of strip feed, of one of said bending stations which is at the downstream end of said paths and said cutting means is located a fixed distance upstream of that one of said bending stations which is at the upstream end of said paths.

18. Apparatus according to claim 17, wherein each said distance is such that strip material fed along said path to said stop means and cut to length and bent will have end limb portions between 2 and 15 cm long measured from each end to the apex of the closer bend.

19. Apparatus according to claim 1, 2 or 3, wherein one fixed and one movable bending station is provided on each path.

20. Apparatus according to claim 1, 2 or 3, wherein said guide means are movable to cause relative approach or separation of said paths, and said stop means and cutting means are movable along one of said paths.

21. A plant for the manufacture of glazing panels including a pair of glazing sheets separated by an intervening marginal spacer frame formed to a required size and shape from strip material and marginally secured between the pair of sheets, comprising a conveyor for conveying glazing sheets, a mechanism for forming such a frame above said conveyor, and means for effecting release of such frame onto an underlying glazing sheet on said conveyor.

22. A plant according to claim 21, additionally comprising a second conveyor for conveying sheets and means for transferring sheets from said second conveyor onto a spacer frame on a sheet carried by said first conveyor.

23. A plant according to claim 21, wherein said mechanism for forming such a frame includes guide means defining at least two paths for feeding required lengths of such strip material, stop means defining a position for the leading ends of such strip material as it is fed, a plurality of bending stations arranged to bend such strip material on at least one said path to form frame corner angles at required distances from said stop means, and means for joining the ends of spacer strip material which has been fed along said paths and bent, thereby to form the frame.

24. A plant according to claim 23, wherein at least one said bending station comprises a backing support abutment and a strip bending member mounted for movement relative to said abutment for progressively wiping or rolling the strip about the abutment.

25. A plant according to claim 24, wherein the abutment and bending member at each bending station are relatively retractable.

* * * * *